Nov. 7, 1972 W. B. HUBER 3,702,192

MAGNETIC TAPE REPRODUCING DEVICE

Original Filed July 22, 1966 2 Sheets-Sheet 1

INVENTOR.
WILLIAM B. HUBER

BY Mueller, Nichols & Raunes

ATTORNEYS.

MAGNETIC TAPE REPRODUCING DEVICE

Original Filed July 22, 1966 2 Sheets-Sheet 2

INVENTOR.
WILLIAM B. HUBER

BY Mueller, Aichele & Rauner

ATTORNEYS.

United States Patent Office 3,702,192
Patented Nov. 7, 1972

3,702,192
MAGNETIC TAPE REPRODUCING DEVICE
William B. Huber, Park Forest, Ill., assignor to Motorola, Inc., Franklin Park, Ill.
Continuation of abandoned application Ser. No. 567,126, July 22, 1966. This application Oct. 2, 1969, Ser. No. 866,078
Int. Cl. G11b *21/08*
U.S. Cl. 274—4 A 4 Claims

ABSTRACT OF THE DISCLOSURE

A mounting for supporting a magnetic tape head which is movable between the different tracks of a recorded multi-track magnetic tape includes a parallel linkage having at least three bars each of which are pivotally connected to a support block, which is positioned parallel to the magnetic tape, at one end and to a movable bracket receiving the tape head at the other end. Two of the bars have one end pivotally connected to opposite sides of the block and the other end of each is inserted in the corresponding sides of the head bracket near the top thereof to pivotally mount the bracket and the head to the block. The third bar is equal in length to the first two bars and is pivotally connected between the block and the bracket near the bottom of the head. The linkage maintains the face of the tape head parallel to the plane of the magnetic tape and prevents torsional rotation thereof with the same being moved between the different tracks of the tape.

This application is a continuation of application Ser. No. 567,126 filed July 22, 1966, now abandoned.

This application pertains generally to a cartridge-type tape player for reproducing multi-track tapes and more particularly to the operating mechanism for such a player.

Cross talk, loss of output on certain tracks and "wow" and "flutter" are problems common to cartridge-type tape players. In general these problems arise from improper alignment of the magnetic tape head with the different tracks of the magnetic tape caused by the necessary movement of the head between the different tracks and improper driving of the tape past the head. The latter is especially true in those applications where the tape player is installed in a vehicle where the tape drive mechanism is subject to bouncing and shock which can cause a vibration in the rate of travel of the tape past the head.

It is an object of this invention to provide an improved operating mechanism for a cartridge-type tape player that reduces cross-talk, loss of output on certain channels and "wow" and "flutter."

It is another object of htis invention to provide an improved mounting for the magnetic tape head of a cartridge-type tape player that permits the head to be moved between the different tracks on the magnetic tape without producing cross talk and loss of output on certain channels.

It is a further object of this invention to provide an improved mounting for the mechanism in a cartridge-type tape player that drives the tape past the magnetic tape head, which mounting conditions the mechanism against bouncing and shock thereby reducing "wow" and "flutter."

A feature of this invention is an operating mechanism for a cartridge-type tape player having a magnetic tape head supported in a bracket and a parallel linkage coupling the bracket to a block fixed parallel to the plane of the magnetic tape. The parallel linkage acts to keep the face of the magnetic tape head parallel to the plane of the tape with the head being moved between the different tracks on the tape thereby reducing cross talk and providing uniform output from all of the tracks.

Another feature of this invention is an operating mechanism for a cartridge-type tape player having a capstan shaft for driving the tape past the magnetic tape head, a housing for the shaft, and a thrust bearing mounted in the housing to limit axial movement of the shaft caused by shock and bouncing of the player thereby reducing "wow" and "flutter."

In the darwings:

In one embodiment of this invention, a tape player adapted to receive and play tape cartridges having recorded multitrack tape thereon includes a cam, which has a plurality of cam surfaces for positioning the magnetic tape head. A cam follower selectively contacts one of the cam surfaces and is connected to the tape head for positioning the same. The solenoid actuated by a contact strip on the tape rotates the cam to position a different one of the cam surfaces in contact with the cam follower thereby moving the head to different tracks on the tape. A capstan shaft contacts the tape for driving it within the cartridge and past the magnetic tape head. A thrust bearing mounted within the capstan housing limits the movement of the capstan shaft in an axial direction. A parallel linkage connects a movable bracket supporting the magnetic tape head to a block that is pivotally mounted to a pivot post and parallel to the plane of the magnetic tape. Means is provided for rotating the block about the pivot post to provide an azimuth adjustment for the magnetic tape head relative to the tape. The parallel linkage provides a mounting for the head and maintains the head face in a plane parallel to the magnetic tape when indexing the head to the different tracks on the tape, and when positioning it between tracks with the cam. By keeping the head face parallel to the tape while changing head positions, the parallel linkage acts to reduce cross talk and provides a uniform output from all tracks.

Figure 1:
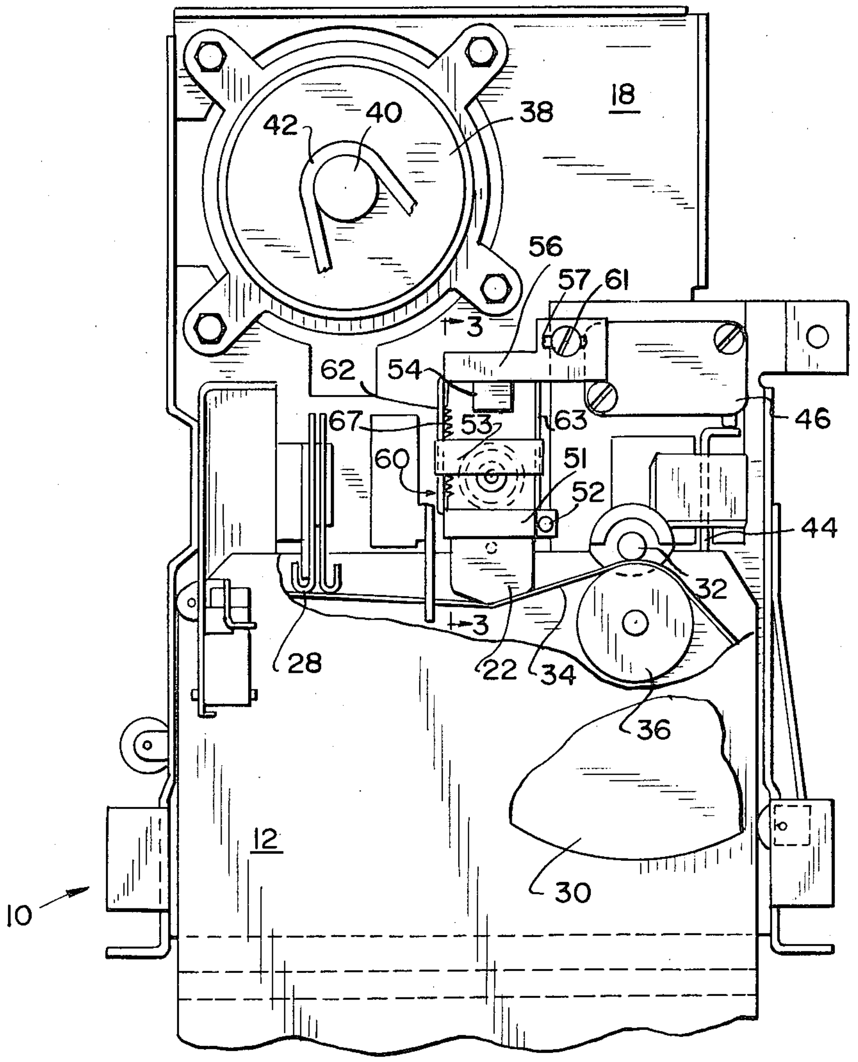
FIG. 1 is a top plan view of the cartridge-type tape player mechanism in accordance with this invention.
Figure 2:
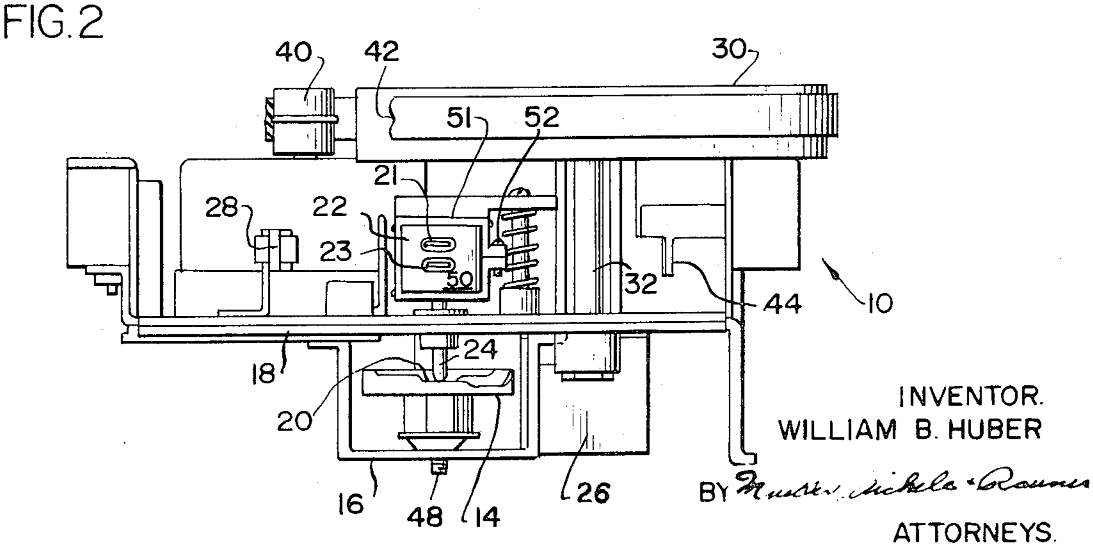
FIG. 2 is a front elevation view of the mechanism of FIG. 1 with the cartridge removed.
Figure 3:
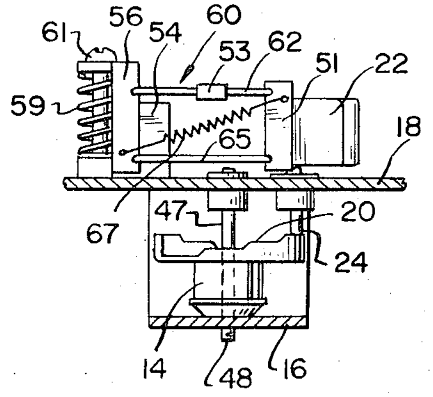
FIG. 3 is a side elevation view of the tape head mounting and operating mechanism in accordance with this invention.
Figure 4:
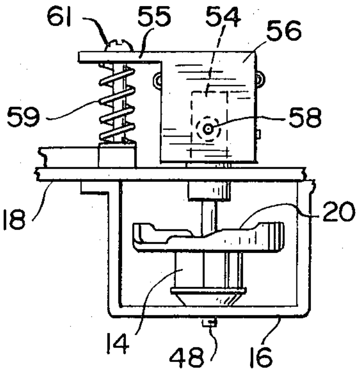
FIG. 4 is a rear elevation view of the device of FIG. 3.

Referring to the figures of the drawings, FIG. 1 and FIG. 2 illustrate a stereophonic tape player 10 adapted to receive and play a tape cartridge 12 which has a stereophonic recorded multi-track tape therein. The tape player 10 includes a cam 14 which is rotatably mounted to the bracket 16, which in turn is connected to the tape deck 18. The cam 14 has a plurality of cam surfaces shown generally at 20 which act to position magnetic tape head 22 through a cam follower 24 that selectively contacts one of the cam surfaces 20 and passes through the tape deck 18 to contact the magnetic tape head 22, and supports the same. The face 50 of the head 22 has two pickup portions 21 and 23. The solenoid shown generally at 24 is actuated by a conductive strip on the magnetic tape contacting the set of contacts 28 to close the solenoid circuit. The solenoid 26 when actuated rotates the cam 14 to position a different one of the cam surfaces 20 in contact with the cam follower 24 to move the head 22 to align the pickup portions with the pairs of tracks on the tape.

A capstan which includes a flywheel 30 and a capstan shaft 32 contacts the tape for driving it within the cartridge 12 and past the magnetic tape head 22. When the cartridge 12 is inserted in the tape player 10, a pressure roller 36, over which the tape 34 passes, is pressed against the capstan shaft 32 to capture the tape 34 between the capstan shaft and the roller 36. A motor 38 has a pulley 40 located thereon which is coupled by a belt 42 to the flywheel 30. When the cartridge is inserted in the tape player, it strikes the plunger 44 which actuates microswitch 46 to energize the motor. When the motor is energized, the belt turns the flywheel 30 to turn the capstan shaft 32 to move the tape 34 past the magnetic tape head 22.

An indexing screw 48 is coupled to the shaft 47 and mounts the cam 14 and shaft to the bracket 16. When indexing the magnetic tape head 22 to the different tracks on the tape, the screw 48 is turned to adjust the head 22 in altitude to align it properly with the tracks on the tape. In many tape player devices the mounting of the tape head 22 has been such that whenever the tape head 22 was indexed to the tracks on the tape by adjusting a device such as screw 48, or when the head was positioned to a pair of different tracks at the end of playing of one set of tracks on the tape by the cam 14, the head would move in an arc with relation to the plane of the tape. This meant that when the head was in a horizontal plane it would be parallel to the plane of the tape, however, as the head was moved from track to track the pickup face 50 of the head 22 would be moved out of the plane containing the tape. This caused misalignment of the pickup face 50 of the head 22 with the pairs of tracks on the tape causing cross talk and reduced output from certain tracks. The unique head mounting of this device, however, permits indexing of the head in altitude to the tracks on the tape while keeping the face 50 of the head parallel to the plane of the tape thereby reducing cross talk and permitting full output from all sets of tracks.

In one embodiment of the invention, the tape head 22 is mounted as illustrated in FIGS. 1 through 4. A movable bracket 51 is clamped around the tape head 22 and tightened in place by screw 52. A pivot post 54 is fixed to the deck 18 of the tape player 10. A movable block 56 is pivotally mounted to the post 54 by pin 58. A parallel linkage or pantograph 60 pivotally connects the bracket 51 and head 22 to the block 56. Pantograph 60 includes a pair of rigid parallel wires 62 and 63. One end of each wire is bent and inserted in apertures for this purpose on opposite sides of the block 56. The other end of each wire is inserted in like apertures in the corresponding sides of the bracket 51 to pivotally mount bracket 51 and the head 22 fixed therein to the block 56. A clamp 53 is snapped over the wires to hold them in place. A third wire 65, which is equal in length to the wires 62 and 63 has each one of its ends pivotally connected in the manner of wires 62 and 63 in the block 56 and bracket 51, respectively. This third wire is parallel to the pair of wires 62 and 63 and supports and maintains the bracket 51 in the same plane as the block 56. The head 22 is placed in the bracket 51 so that the face 50 is parallel with the plane of the tape. The block 56 is fixed in a predetermined plane which is parallel to the plane of the tape 34. Therefore, the pantograph 60 maintains the face 50 of the tape head 22 parallel to the tape 34 regardless of the point in a vertical plane to which the head 22 is positioned by cam follower 24, on which it rests, or index screw 48. A spring 67 is connected between the bracket 51 and block 56 to positively bias the head 22 against cam follower 24.

An arm 55, integral with block 56, has an aperture 57 therein through which a screw 61 extends. The screw 61 is threaded through the tape deck 18. A spring 59 encircles the screw 61 and is compressed between the arm 55 and the deck 18. By manipulating screw 61 the block 56 may be pivoted about the pin 58 to provide an azimuth adjustment for the head 22. The movement of the block 56 is in the plane parallel to the plane of the tape 34, so the altitude alignment of the head 22 is not affected.

Figure 6:
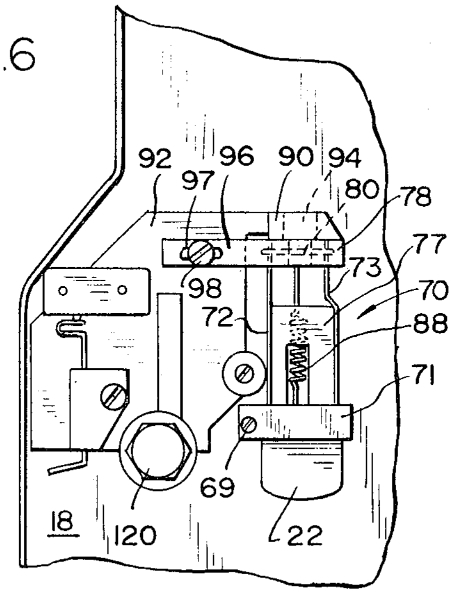
FIG. 6 is a bottom plan view of a second embodiment of a tape head mounting device in accordance with this invention.
Figure 8:
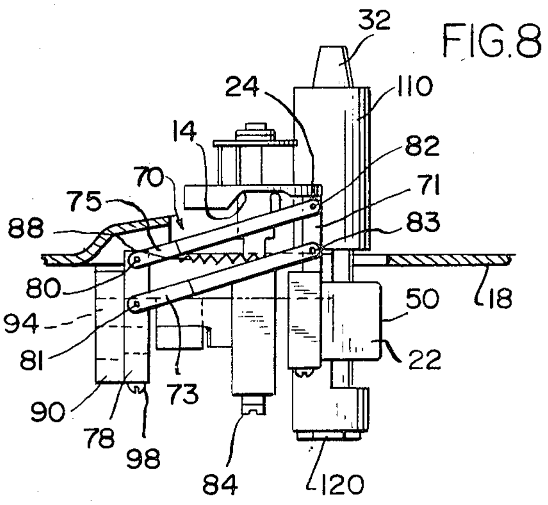
FIG. 8 is a side elevation view of the device of FIG. 6.
Figure 7:
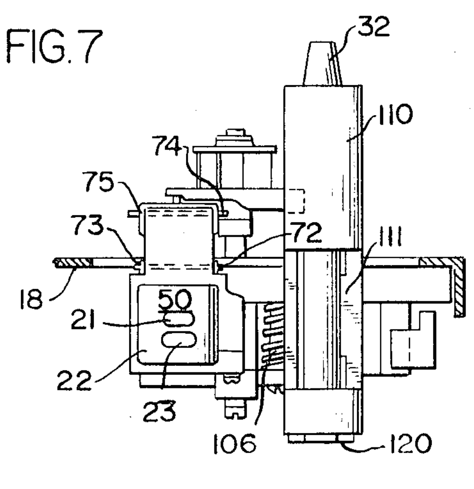
FIG. 7 is a front elevation view of the device of FIG. 6.

Another embodiment for mounting the tape head 22 is shown in FIGS. 6 through 8 and also uses the principle of the pantograph. Like elements are given numbers corresponding to those numbers identifying the elements in the first embodiment. The head 22 is shown in an inverted position with respect to the tape deck 18 as compared to the head 22 in FIGS. 1–4. The reason for this is that depending on the model of the tape player the cartridge 12 is inserted either above or below the deck.

In this support, the head 22 is once again captured in a bracket 71 which is tightened about the head with screw 69. The pantograph or parallel linkage 70 in this instance consists of two arms 72 and 73 integral with a connecting base 77 to form a channel piece, and two arms 74 and 75 connected in a similar manner to form a second channel piece. The arm of both channel pieces are of equal length, and the base portions lend rigidity to the channel structure. Two arms 73 and 75 are equally spaced and pivotally mounted to one side of block 78 and to the corresponding side of bracket 71 by pins 80, 81, 82 and 83, which extend through the block 78 and bracket 71 respectively. The pivot points are aligned and fixed parallel to the plane of the tape 34. The remaining two arms of the pantograph 70 mainly 74 and 72 are pivotally connected to the opposite sides of block 78 and bracket 71 by the pins. The pantograph or parallel linkage 70 acts to keep the face 50 of the magnetic tape head 22 parallel to the plane containing the tape 34 whenever the altitude of the head is varied in relation to the tape by either moving index screw 84 to vary the position of the cam 14 when aligning the tape head to the various tracks on the tape, or by moving the head 22 between the sets of tracks of the tape 34 upon completion of the playing of a pair of tracks. A spring 88 is connected between the bracket 71 and the block 78 and biases the tape head bracket 71 and cam follower 24 against the cam 14.

The block 78 that is fixed parallel to the plane of the tape 34 is pivotally connected by pivot pin 94 to a pivot post 90, which is part of the capstan housing 92. An arm 96 is integral with the block 78 and has an opening 97 therein. A screw 98 extends through the opening and is threaded in the housing 92 of the capstan. A spring 100 biases the arm 96 against the head of the screw 98. Therefore, by manipulating the screw 98, the arm 96, hence block 78 may be made to pivot about the post 90 to vary the azimuth setting of the tape head 22 with respect to the tape 34 without, however, moving the block 78 out of a plane parallel to the plane of the tape 34.

Figure 5:
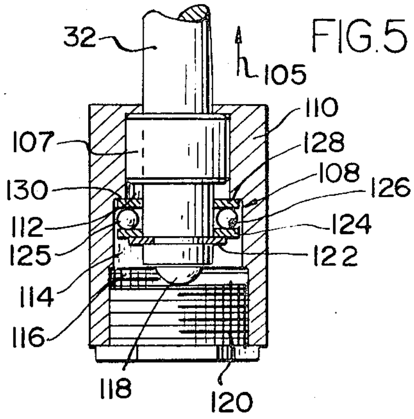
FIG. 5 is a side elevation view in cross-section of a mounting for the tape drive mechanism in accordance with this invention.

Tape players mounted in vehicles are often subjected to excessive bouncing and shock. This at times has caused the capstan shaft 32 to be bounced to the extent that it moves in an axial direction as shown by the arrow 105 in FIG. 5. The moving of the shaft 32 in the bearings of the capstan, one of which is shown at 107, has caused the speed of the tape 34 to be varied as it passes the magnetic tape head 22 causing a certain amount of "wow" and "flutter." To overcome this, the capstan mounting for this device incorporates a thrust bearing 108 mounted in the capstan housing 110. The capstan housing includes a bore 112 and a counter bore 114 and has a threaded aperture 116 in the bottom thereof. The capstan shaft 32 has bearing 118 on the bottom of it supported by nut 120, which is threaded into the aperture 116. A snap ring 122 is fitted around the shaft 32 and engages a washer 124 that forms one of the races for the thrust bearing. A plurality of ball bearings 126 are positioned around the shaft 33 in a retainer 125 and ride on the washer 124 and a second washer 128 that serves as the other race ring. Tightening the nut 120 into the capstan housing 110 moves the snap ring 122 against the washer 124 to move the thrust bearing 108 until the washer 128 fits snugly in the shoulder 130 formed by the bore 112 and counter bore 114. A jar or shock might cause the shaft 32 and flywheel 30 to move in an axial direction. The thrust bearing 108 prevents this movement by butting against the shoulder 130. The ball bearings 126, however, permit the shaft 32 to continue to turn without interference even though a force is applied to the thrust bearing.

In some instances the magnetic tape has been known to become bunched up and wrapped around the capstan shaft 32. To prevent this a projecting portion 111 (FIG. 7) is cast integral with the capstan housing and extends until there is a bare clearance between the shaft and portion 111. Therefore, if the tape becomes bunched up or slack, the portion 111 will prevent it from being wrapped around the shaft 32.

What has been described, therefore, is an improved mechanism for a cartridge-type tape player that permits the magnetic tape head to be moved between the different tracks on the magnetic tape without producing cross talk and loss of output on certain tracks. The mechanism further provides an improved mounting for the tape drive mechanism which conditions the drive against bouncing and shock to reduce "wow" and "flutter."

I claim:

1. A mounting for a magnetic tape head movable to cooperate with the different tracks of a recorded multi-track magnetic tape for reproducing the same, the mounting including in combination, first support means positioned parallel to the plane of the magnetic tape, tape head support means, a parallel linkage comprising at least three bars, each of said bars being pivotally connected between said tape head support means and said first support means for supporting the tape head with the face thereof parallel to the plane of said first support means, said bars preventing torsional rotation of the tape head and acting to keep the face of the magnetic tape head parallel to the plane of the magnetic tape with the head being moved perpendicular to the plane of the tape to positions for cooperating with the different tracks of the tape.

2. The mounting for the magnetic tape head of claim 1 further including a pivot post, and wherein said first support means is a block, said block being pivotally mounted to said post parallel to the plane of the magnetic tape, and means for pivotally moving said block to provide an azimuth adjustment to the magnetic tape head in relation to the magnetic tape.

3. The mounting for the magnetic tape head of claim 1 wherein said first support means includes a block and said tape head support means includes a movable bracket receiving the head, and said parallel linkage includes a pair of equidistant rigid parallel wires one end of each being inserted in opposite sides of said block and the other end of each being inserted in the corresponding sides of said bracket near the top thereof to pivotally mount said bracket and the head to said block, and a third wire equal in length to said pair of wires and being pivotally connected between said block and said bracket near the bottom thereof to establish and maintain the face of the tape head parallel to the plane of the magnetic tape, and a spring connected between said bracket and said block to bias the tape head to a predetermined position, said rigid wires preventing torsional rotation of the tape head with the same being moved between the different tracks of the tape.

4. The mounting for the magnetic tape head of claim 1 wherein said first support means includes a block and said parallel linkage includes first and second channel pieces each having two arms and an integral base portion providing rigidity therefor, and means for pivotally mounting said arms of each of said channel pieces in a spaced relation to one another on opposite sides of said block and said bracket, with the pivot points thereof on said block and said bracket respectively being aligned in a plane parallel to the plane of the magnetic tape, said channel pieces acting to keep the face of said magnetic tape head parallel to the plane of the magnetic tape with the head being moved between the tracks of the tape, and said channel pieces being rigid thereby prevent torsional rotation of the tape head with the same being moved between the different tracks of the tape.

References Cited

UNITED STATES PATENTS

| | | |
|---|---|---|
| 2,721,743 | 10/1955 | Erikson et al. |
| 3,060,277 | 10/1962 | Baker et al. |
| 3,370,131 | 2/1968 | Reed. |
| 3,400,227 | 9/1968 | Wear et al. |

J. RUSSELL GOUDEAU, Primary Examiner

U.S. Cl. X.R.

179—100.2 CA; 226—194